3,483,965
PLASTIC COVERED OBJECTS AND METHOD FOR PRODUCING SAME
Herbert Rosenblatt, Cressona, Pa., and Thomas L. Mariani, Clifton, and Philip R. Arvidson, Mendham, N.J., assignors to Allied Chemical Corporation, New York, N.Y., a corporation of New York
Filed Apr. 12, 1968, Ser. No. 720,982
Int. Cl. B65d 65/02, 65/16
U.S. Cl. 206—46                              6 Claims

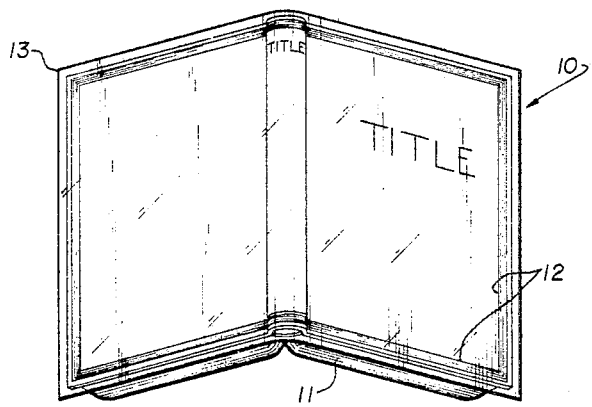
FIG.1
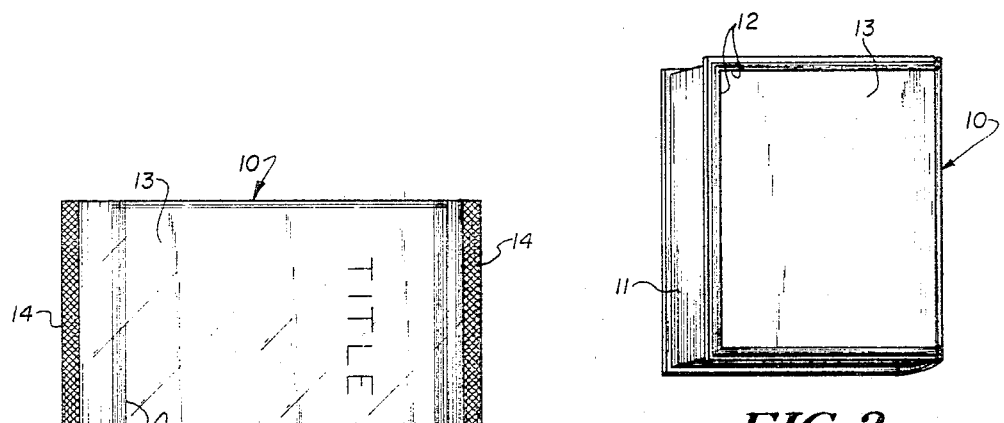
FIG.2
FIG.3
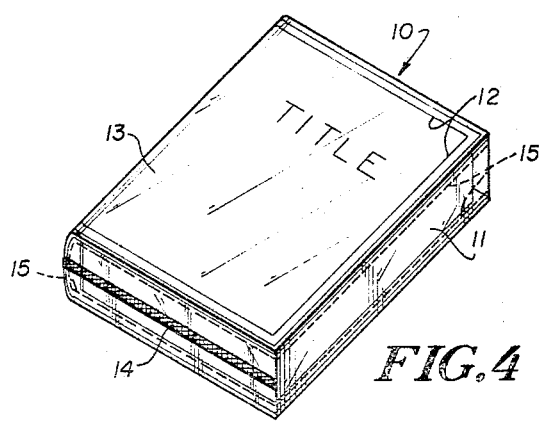
FIG.4
INVENTORS:
HERBERT ROSENBLATT
THOMAS L. MARIANI
BY PHILIP R. ARVIDSON
ATTORNEY United States Patent Office 3,483,965
Patented Dec. 16, 1969

ABSTRACT OF THE DISCLOSURE

This application relates to a method for covering objects, particularly books, with heat-shrinkable plastic film which comprises broadly the steps of:
 (a) applying contact adhesive tape having adhesive on both sides thereof adjacent to the peripheral edges of the object,
 (b) covering at least a substantial portion of the surface of the object with heat-shrinkable plastic film,
 (c) adhering the film to the tape by pressing the film against the tape,
 (d) applying sufficient heat to the film to shrink it to a smooth taut cover for said object.

This application also relates to objects packaged by this process.

When books are packaged by this process, tabular film sealed at each end of the book can be used. Perforations can then be placed in the film adjacent the edges of the book binding so that the thus formed perforated portion of film adjacent the edges of the pages can be torn away as a strip by the consumer, leaving a smooth taut dust cover on the binding of the book.

BACKGROUND OF THE INVENTION

This invention relates to the field of packaging and more specifically to the field of packing objects which have the form of rectangular prisms. More particularly this invention relates to the field of packaging books so as to provide dust covers on the binding thereof.

It is often desirable to package objects with smooth taut plastic covers which are easily applied. This is particularly true in the case of books, where it is desirable to have smooth taut dust covers to protect the bindings from wear and dirt and to insure that the books slide easily with respect to each other when they are put on shelves.

Previous packaging methods have required the use of prefolded covers or covers which required prefabrication in some manner, with obvious disadvantages of cost.

It is an object of this invention to provide a method for covering objects which is simple to use.

It is another object of this invention to provide a method for covering objects which provides a smooth, taut cover on said object.

It is also an object of this invention to provide a method of covering books which is simple, inexpensive and provides a smooth, taut dust cover for the books.

It is a further object of this invention to provide a packaged book which can be marketed as a closed package and can be opened by the consumer without tools by simply ripping away a perforated strip portion, leaving a book having a smooth, taut dust cover thereon.

Other and further objects of this invention will be obvious to those skilled in the art from the following specification and accompanying drawings.

SUMMARY OF THE INVENTION

Briefly and broadly this invention comprises a process for covering an object having peripheral edges which comprises the steps of:
 (a) applying contact adhesive tape having adhesive on both sides thereof to the object adjacent to peripheral edges thereof,
 (b) covering at least a substantial portion of the surface of the object with heat-shrinkable plastic film,
 (c) adhering the film to the tape by pressing the film against the tape,
 (d) applying sufficient heat to the film to shrink it to a smooth, taut cover for the object.

The process of this invention is particularly adaptable to providing smooth, taut plastic dust covers for hardbound books. When the process is used for this purpose, the adhesive tape, which has adhesive on both sides, is applied to the periphery of the binding adjacent the edges thereof. Then a sheet of heat-shrinkable plastic film is applied to the book and pressed against the adhesive tape so as to secure the film to the book.

The film can be applied to the book in either of two ways. First, a flat sheet of plastic film slightly larger than the surface of the book, to allow for contraction upon heating, can be applied to the book by laying the book thereon. Second, the book can be inserted into a tube of plastic film and the film pressed against the adhesive tape. The latter method is used when a sealed package is desired for purposes of marketing in supermarkets, drug stores and other such places.

After the film has been applied to the book, the book is exposed to heat sufficient to shrink the film to a smooth, taut cover. In the case of the use of a flat sheet of film, no further action is required. In the case of use of a tubular sheet of film the ends of the tube are sealed adjacent the book before shrinking. Thus, after the shrinking process has been completed, a smooth taut package has been provided. If desired, perforations can be made in the plastic film adjacent the edges of the book binding so that a strip can be ripped away by the consumer exposing the edges of the pages of the book but leaving a smooth taut dust cover on the binding.

This application also relates to the products produced by the above process, which products will be obvious from the description of the process.

BRIEF DESCRIPTION OF THE DRAWINGS

FIGURE 1 shows a book opened and spread out on a flat surface with a sheet of heat-shrinkable transparent plastic film slightly larger than the book spread thereover.

FIGURE 2 shows the book of FIGURE 1 after the plastic film has been shrunk to finish size.

FIGURE 3 shows a book encased in a tubular film of plastic sealed at each end. The position of the end seals has been exaggerated somewhat for purposes of clarity.

FIGURE 4 shows a modification of the package of FIGURE 3, in which perforations have been used to form a removable strip.

DESCRIPTION OF THE PREFERRED EMBODIMENT

Referring more particularly to FIGURE 1, reference numeral 10 indicates the hard binding of a book having its pages 11 spread out on a flat surface. Reference numeral 12 indicates a strip of contact adhesive tape, having adhesive on both sides thereof, which has been applied to the book binding 10 around the perimeter thereof adjacent the edge. Reference numeral 13 indicates a sheet of heat-shrinkable plastic film which has been adhered to tape 12 by passing the plastic thereagainst. As is clearly shown by the drawing, a surplus of plastic film has been left around the edges of the binding to allow for heat shrinking.

Referring more particularly to FIGURE 2, this figure shows the finished product obtained by heat shrinking the plastic film of FIGURE 1. As will be seen from the drawing, sheet 13 of film has been shrunk to the point where its edges are flush with the edges of the book binding. A taut, smooth cover for the book binding is thus obtained.

Referring more particularly to FIGURE 3, this figure shows a slightly different embodiment of this invention. Again reference numeral 10 indicates the hard binding of the book and reference numeral 12 indicates the contact adhesive tape to which plastic film covering 13 is adhered. In this particular embodiment a tube of plastic film was used rather than a sheet. The book was inserted in the tube and the film was adhered to the adhesive tape by pressing it thereagainst in the usual manner. Then the ends of the tube were sealed by heat or other conventional methods, as shown at 14 and heat was applied to the film to shrink it to a tight sealed package. The position of heat seals 14 has been somewhat exaggerated in order to better show them on the drawing. In actual practice of the invention, the heat shrinking of the plastic film after sealing would draw the sealed edges closely up against the edges of the pages of the book.

Referring more particularly to FIGURE 4, reference numera 10 indicates the hard binding of the book, reference numeral 11 indicates the pages of the book, and reference numeral 12 again indicates the tape to which the plastic film cover is adhered. Reference numeral 13 indicates the plastic film cover of the book, which in this case is transparent, and reference numeral 14 indicates the heat sealed portions of the tube of film. In this embodiment of this invention perforations have been added to the plastic cover of FIGURE 3, as indicated at 15. These perforations extend around the entire perimeter of the book binding immediately adjacent thereto. In use, after the purchaser had bought the packaged book and is ready to use same, he can simply grap the perforated portion of the plastic package with his fingers and tear away the perforated strip exposing the edges of the pages and leaving a book having a smooth, taut dust cover in the same form as shown in FIGURE 2.

Although this invention has been shown and described with particular reference to the use of transparent films, translucent and opaque films can also be used.

Although the terminology heat-shrinkable plastic film will immediately suggest many usable films to one skilled in the art, specific examples of such films are biaxially oriented plastic films such as polyvinyl chloride, polypropylene and nylon. Biaxially oriented polyvinyl chloride is preferred because of its relatively low shrinking temperature.

For purposes of simplicity, FIGURE 1 of the drawing shows a layer of heat-shrinkable plastic film applied to an open book. In practice it has been found that the best method of applying the film to the book is to lay one side of a closed book on the film and press the book thereagainst to adhere the film to the tape. The book is then rolled over so that the other face of the book contacts the remainder of the plastic film. If the plastic film is applied to the book in the manner shown in FIGURE 1 care must be taken during heating to insure that the film does not become so tight as to prevent closing the book.

Although one skilled in the art will immediately be familiar with temperature conditions for shrinking heat-shrinkable plastic film, by way of example the temperature utilized will normally range from about 145 to about 185 degrees Fahrenheit with poyvinyl chloride film.

The length of time for which heat is applied is determined by observing shrinkage and stopping when the desired shrinkage has occurred. For example, at about 160° F. the shrinkage of a book cover in the manner described above will take from about one to 120 seconds depending upon the sophistication of heating equipment used. For example if the air blast from an oridinary hair dryer is used the shrinkage of a book cover will take about two minutes; however, if sophisticated commercial equipment is used the same shrinkage can be accomplished in a second or less.

Although this invention has been described with respect to particular embodiments, it is to be understood that it is not to be limited thereto but is to be restricted only by the scope of the invention.

We claim:

1. In a process for covering an object having peripheral edges comprising applying contact adhesive tape, having adhesive on both sides thereof, to the object adjacent the peripheral edges thereof, the improvement which comprises the steps of:
   (a) covering at least a substantial portion of the surface of the object with a heat-shrinkable plastic tube, applied to the object by placing the object inside said tube of film,
   (b) adhering the film to the tape by pressing the film against the tape,
   (c) applying sufficient heat to the film to shrink it to a smooth, taut, cover for the object.

2. The process of claim 1 wherein said object is a polyhedron.

3. The process of claim 2 wherein said object is a rectangular prism.

4. The process of claim 3 wherein said object is a book having a hard cover binding and wherein the tape is secured to the periphery of the binding and the portion of the surface covered is the binding of the book.

5. A process for covering a book which is a rectangular prism having a hard-cover binding which comprises the steps of:
   (a) applying contact adhesive tape having adhesive on both sides thereof to the periphery of the binding,
   (b) covering at least a substantial portion of the surface of the book with heat-shrinkable plastic film by placing the book inside a tube of film and pressing the film against the tape,
   (c) applying sufficient heat to the film to shrink it to a smooth, taut cover for said book, the tube of film being sealed adjacent the book at each end, and
   (d) said film being perforated adjacent the binding of the book after the application of heat.

6. A book having a hard-cover binding, contact adhesive tape means secured adjacent to peripheral edges of said binding, said tape means having adhesive on both sides thereof, heat-shrunk plastic tube means adhered to said tape means, said tube means being closed at each end and completely enveloping said book, and wherein said plastic tube has perforation means adjacent the periphery of the binding so as to allow the portion of said plastic tube covering the edges of said book pages to be torn away.

References Cited

UNITED STATES PATENTS

| 1,885,345 | 11/1932 | Guthrie. |
| 2,142,194 | 1/1939 | Karfiol. |
| 2,330,619 | 9/1943 | Pomeranz _____ 281—34 X |
| 2,802,764 | 8/1964 | Slayter et al. |
| 3,273,302 | 9/1966 | Walter _____ 206—45.33 X |

FOREIGN PATENTS

| 1,240,054 | 7/1960 | France. |

MARTHA L. RICE, Primary Examiner

U.S. Cl. XR.

53—30; 156—85; 206—45.33; 229—87; 281—34